United States Patent [19]  [11] 4,357,452
Kakogawa et al.  [45] * Nov. 2, 1982

[54] PROCESS FOR POLYMERIZING PROPYLENE

[75] Inventors: Genjiro Kakogawa; Masayoshi Hasuo; Yoshinori Suga, all of Yokohama; Hisashi Kitada, Tokyo; Yumito Uehara, Kawasaki, all of Japan

[73] Assignee: Mitsubishi Chemical Industries Limited, Tokyo, Japan

[*] Notice: The portion of the term of this patent subsequent to Mar. 24, 1998, has been disclaimed.

[21] Appl. No.: 169,453

[22] Filed: Jul. 16, 1980

Related U.S. Application Data

[63] Continuation-in-part of Ser. No. 5,471, Jan. 22, 1979, Pat. No. 4,258,161.

[30] Foreign Application Priority Data

Feb. 14, 1978 [JP] Japan ................................. 53-15758
Sep. 12, 1978 [JP] Japan ................................. 53-111865

[51] Int. Cl.³ .......................... C08F 4/64; C08F 10/06
[52] U.S. Cl. ..................................... 526/139; 526/141; 526/142; 526/153; 526/158; 526/159; 526/161
[58] Field of Search ............... 526/139, 140, 141, 142, 526/119, 153, 158, 159, 161

[56] References Cited

U.S. PATENT DOCUMENTS

| | | | |
|---|---|---|---|
| 4,060,593 | 11/1977 | Kozuo et al. | 526/142 |
| 4,123,387 | 10/1978 | Shiga et al. | 526/142 |
| 4,127,504 | 11/1978 | Ueno et al. | 526/142 |
| 4,127,505 | 11/1978 | Ueno et al. | 526/142 |
| 4,136,243 | 1/1979 | Appleyard et al. | 526/142 |
| 4,151,112 | 4/1979 | Wristers | 526/142 |
| 4,258,161 | 3/1981 | Kakogawa et al. | 526/140 |

FOREIGN PATENT DOCUMENTS

| | | | |
|---|---|---|---|
| 1128724 | 7/1965 | United Kingdom | 526/142 |
| 1391067 | 4/1975 | United Kingdom | 526/142 |

*Primary Examiner*—Edward J. Smith
*Attorney, Agent, or Firm*—Oblon, Fisher, Spivak, McClelland & Maier

[57] ABSTRACT

Propylene is polymerized in the presence of a catalytic system of the type which comprises a solid titanium trichloride-based complex serving as a catalyst, said complex having an atomic ratio of aluminum to titanium in the range of below 0.15:1 and containing a complexing agent, and an organic aluminum compound of the general formula, $AlR^1{}_nCl_{3-n}$ wherein $R^1$ represents an n-propyl group or an n-hexyl group and n is a value of 1.95–2.10. The catalytic system may further comprise an electron-donor compound as a third catalytic component.

15 Claims, No Drawings

PROCESS FOR POLYMERIZING PROPYLENE

CROSS-REFERENCE TO RELATED APPLICATIONS

This application is a continuation-in-part of application Ser. No. 5,471 filed Jan. 22, 1979, now U.S. Pat. No. 4,258,161.

BACKGROUND OF THE INVENTION

1. Field of the Invention

This invention relates to a process for polymerizing propylene. More particularly, it relates to a process for polymerizing propylene by the use of a catalytic system composed of a highly active, solid titanium trichloride-based catalytic complex and a specific organic aluminum compound.

2. Description of the Prior Art

It is well known to use a solid titanium trichloride-based catalytic complex as a catalyst and an organic aluminum compound as a cocatalyst for the stereospecific polymerization of propylene. It is also known that the organic aluminum compound gives different influences on activity for polymerization and stereospecificity depending on the type thereof. In known processes of polymerizing propylene using an organic aluminum compound as a cocatalyst, however, a cocatalyst represented, for example, by the general formula, $AlR_2X$ (in which R represents an alkyl group and X represents a halogen atom) contributes to impart high stereospecificity but is low in polymerization activity, so that the amount of polymer formed per unit amount of catalyst (hereinafter referred to as catalytic efficiency) is low, thus requiring an additional step of removing the catalyst from the polymer product. On the other hand, a cocatalyst represented by the general formula, $AlR_3$ (in which R represents an alkyl group) gives high polymerization activity and is thus high in catalytic efficiency. However, the cocatalyst of this type results in a polymer of very low stereospecificity, requiring a step of removing amorphous polymer from the polymer product. Thus, both types of the aluminum compounds are disadvantageous.

In order to improve the polymerization activity, when an organic aluminum compound expressed by the general formula, $AlR_2X$, particularly, diethylaluminum monochloride now widely used industrially, is used as a cocatalyst, it is known to add to the above organic aluminum compound small amounts of a compound expressed by the general formula, $AlR_3$, e.g. triethylaluminum, triisobutylaluminum or the like in such a manner that the ratio of R to Al is in the range of above 2:1. In this case, though the polymerization activity is improved as will be clearly seen from Comparative Examples shown hereinafter, the stereospecificity is lowered to a considerably extent. Thus, this catalytic system is considered disadvantageous as an industrial catalyst in view of its poor practicability. From the above, it has been revealed that when diethylaluminum monochloride is used as a cocatalyst, its purity is an important factor for retaining the stereospecificity advantageously developed from the monochloride compound. In other words, it has been found that it is important to keep the ratio of an ethyl group to Al at 2:1.

An intensive study has now been made of a cocatalyst expressed by the general formula, $AlR_2X$. As a result, it has been found that a catalytic system using a compound expressed by the general formula, $AlR_nCl_{3-n}$ with the R and n being specifically defined is high in polymerization activity and ensures high stereospecificity.

SUMMARY OF THE INVENTION

According to the present invention, a process is provided for polymerizing propylene in which propylene is polymerized in the presence of a solid titanium trichloride-based complex, as a catalyst, having such an aluminum content that the atomic ratio of aluminum to titanium is in the range of below 0.15:1 and containing a complexing agent and an organic aluminum compound as a cocatalyst, characterized in that said organic aluminum compound is one expressed by the general formula $AlR_n^1Cl_{3-n}$ wherein $R^1$ represents a normal propyl group or a normal hexyl group, and n is a value of 1.95–2.10.

DETAILED DESCRIPTION OF THE PREFERRED EMBODIMENTS

The solid titanium trichloride-based complex used as a catalyst in the practice of the invention has an aluminum content such that the atomic ratio of aluminum to titanium is in the range of below 0.15:1, preferably below 0.1:1 and most preferably below 0.02:1, and contains a complexing agent. The content of the complexing agent is such that the molar ratio of the complexing agent to the titanium trichloride contained in the solid titanium trichloride-based catalytic complex is in the range of above 0.001:1, preferably above 0.01:1.

In particular, the catalytic complex is one which is expressed, for example, by the formula, $TiCl_3 \cdot (AlR_p^3X_{3-p})_x \cdot (C)_y$ (in which $R^3$ represents a hydrocarbon group having 1–20 carbon atoms, X represents a halogen atom, p is a value of $0 \leq p \leq 2$, C represents a complexing agent, x is a value of below 0.15, and y is a value of above 0.001). As a matter of course, the catalytic complex may contain, aside from the $TiCl_3$ component, an $AlR_p^3X_{3-p}$ component and complexing agent C component, a small amount of iodine, a compound obtained by substituting part or all of the chlorine of the titanium trichloride with iodine or bromine, an inert inorganic solid such as of $MgCl_2$, $MgO$ or the like, or a powdered olefin polymer such as powdered polyethylene, polypropylene or the like. Examples of the complexing agent C include ethers, thioethers, ketones, carboxylic acid esters, amines, carboxylic acid amides, polysiloxanes and the like. Of these, the ethers or thioethers are most preferable. Ethers or thioethers are those which are expressed by the general formula, $R^4-O-R^5$ or $R^4-S-R^5$ (in which $R^4$ and $R^5$ independently represent a hydrocarbon group having below 15 carbon atoms). Specific examples of the ethers or thioethers will be mentioned hereinafter. $AlR_p^3X_{3-p}$ is, for example, $AlCl_3$ or $AlR^3Cl_2$.

The solid titanium trichloride-based catalytic complex useful in the process of the invention is most preferably one which has an X-ray diffraction chart such that its halo of maximum intensity is located at a position corresponding to the maximum peak position of α-titanium trichloride (i.e. in the vicinity of $2\theta = 32.9°$). The solid titanium trichloride-based catalytic complex is preferred not to undergo a heat history exceeding 150° C. during the preparation of the complex.

The catalytic complex can be readily prepared by any of several methods including:

(a) A method of precipitating the complex at a temperature below 150° C. from a liquid medium containing titanium trichloride and an ether or a thioether; and (b) A method of treating solid titanium trichloride obtained by reducing titanium tetrachloride with an organic aluminum compound or metallic aluminum with a complexing agent and then a halogen compound.

The method (a) has been already described in Japanese Patent Application Nos. 49-88476, 49-88477, 49-120100, 50-1154, 50-16722, 50-19552, 52-140922 and 52-147590. Particularly stating, a liquid medium containing titanium trichloride and an ether or a thioether can be obtained by either of the following two methods:

(A) A method in which titanium tetrachloride is provided as a starting material and is reduced with an organic aluminum compound in an ether or a thioether and, if necessary, in a suitable hydrocarbon solvent; and (B) A method in which solid titanium trichloride is provided as a starting material and is treated with an ether or a thioether, if necessary, in a suitable hydrocarbon solvent.

The ethers and thioethers useful for the above purposes are those which are defined by the foregoing general formulae in which $R^4$ and $R^5$ independently represent an alkyl group, preferably a linear alkyl group, such as ethyl, n-propyl, n-butyl, n-amyl, n-hexyl, n-heptyl, n-octyl, n-decyl, n-dodecyl or the like; an alkenyl group, preferably a linear alkenyl group, such as butenyl, octenyl or the like; an aryl group such as tolyl, xylyl, ethylphenyl or the like; and an aralkyl group such as benzyl. Preferably, dialkyl ethers, dialkenyl ethers, alkyl alkenyl ethers, dialkyl thioethers are used.

Suitable hydrocarbon solvents are saturated aliphatic hydrocarbons such as n-pentane, n-hexane, n-heptane, n-octane, n-dodecane, liquid paraffin and the like, alicyclic hydrocarbons such as cyclohexane, methylcyclohexane and the like, and aromatic hydrocarbons such as benzene, toluene, xylene and the like. The choice of the hydrocarbon solvent depends on the type of ether or thioether. For instance, when an ether or thioether of the foregoing general formula in which at least one of $R^4$ and $R^5$ in an alkyl group or alkenyl group having 3-5 carbon atoms is used, an aromatic hydrocarbon is preferably selected and, after the aromatic hydrocarbon, an alicyclic hydrocarbon is used. If an ether of the formula in which $R^4$ and $R^5$ are individually an alkyl group or alkenyl group having six or more carbon atoms is employed, a saturated aliphatic hydrocarbon is preferably used.

Examples of the organic aluminum compound useful in the method (A) are compounds expressed by the general formula $AlR_q^6X_{3-q}$ (in which $R^6$ represents a hydrocarbon group having 1–20 carbon atoms, q represents a value of 1–3, and X represents a halogen atom).

The aluminum compound is used in such an amount that the molar ratio of titanium contained in the titanium tetrachloride to the hydrocarbon group of the organic aluminum compound (i.e. $R^6$ of the general formula) is in the range of 1:0.1–1:50, preferably 1:0.3–1:10.

The ether or thioether is used in such an amount that the molar ratio of ether:titanium tetrachloride is in the range of 1:0.05–1:5, preferably 1:0.25–1:2.5. The reduction reaction may be conducted by any arbitrary method and is normally effected by contacting the three components successively in an arbitrary order at a temperature of 0°–50° C. to give a liquid medium. It will be noted that addition of iodine, titanium tetraiodide or titanium tetrabromide to the starting titanium tetrachloride in a small amount, e.g. in a molar ratio to the titanium tetrachloride of about 0.005–0.3:1, is desired since the resulting solid titanium trichloride-based catalytic complex becomes very active and can produce a polymer of high stereospecificity.

As the starting solid titanium trichloride in method (B), a compound may be used which is prepared by reducing titanium tetrachloride with hydrogen gas or aluminum. Preferably, titanium trichloride is used which is obtained by reducing titanium tetrachloride with an organic aluminum compound. The amount of the ether or thioether is such that the molar ratio of titanium trichloride to ether or thioether is in the range of above 1:1, preferably 1:1–5. The treatment with ether or thioether is generally conducted at 0°–100° C., preferably 20°–50° C.

In the method (a), the fine particulate solid titanium trichloride-based catalytic complex is precipitated at a temperature below 150° C. from the liquid medium prepared by the above method (A) or (B). Any convenient precipitation technique can be employed and the present invention is not limited to any particular method. The liquid medium may be heated as it is or after being diluted with a hydrocarbon diluent, if necessary, to a temperature of below 150° C., generally 20°–150° C., preferably 40°–120° C. and most preferably 60°–100° C., thereby permitting the precipitation. It will be noted that when the total molar amount of the titanium and aluminum contained in the titanium trichloride liquid medium is smaller than the moles of the ether or thioether, a liberating agent may be added to expedite the precipitation. The liberating agent should have a capability of precipitating free solid titanium trichloride by reaction with the complex of the titanium trichloride and the ether or thioether, and includes Lewis acids which are more acidic than titanium trichloride, such as, for example, titanium tetrachloride, boron trifluoride, vanadium tetrachloride, aluminum trichloride, alkylaluminum dihalide, alkylaluminum sesquihalide, dialkylaluminum halide and the like. Of these, titanium tetrachloride and aluminum halides such as aluminum trihalides, alkylaluminum dihalides, etc. are preferable. The amount of the liberating agent is preferred to be less than 5 times the molar amount of the titanium in the liquid medium.

The method (b) has been described in Japanese Laid-open Patent Publication Nos. 47-34478 and 48-64170 and Japanese Patent Application Nos. 49-17120 and 49-29622. More particularly, titanium tetrachloride is first reduced with an organic aluminum compound or metallic aluminum. The organic aluminum compounds of the general formula illustrated in the method (a)-(A) are similarly used in this case. The reduction reaction is feasible by any known technique. For example, in reduction using an organic aluminum compound, the organic aluminum compound is added, in a diluent, to titanium tetrachloride in an amount in excess of 1 times by mole, preferably 1–10 times by mole, that of the titanium tetrachloride at a temperature of approximately −50° C.–30° C. and the mixture is heated to a temperature of −10°–100° C. to complete the reaction. Where metallic aluminum is used for the reduction, it will suffice that 0.1–1 gram atom of metallic aluminum per mole of titanium tetrachloride is added to titanium tetrachloride together with a small amount of $AlCl_3$ in a diluent such as xylene or in the absence of the diluent and the mixture is heated to 80°–300° C., preferably 100°–200° C.

In the method (b), the thus obtained solid titanium trichloride is then treated with a complexing agent and a halogen compound. As the complexing agent, there may be likewise used the compounds which have been exemplified hereinbefore as the complexing agent C. Titanium tetrachloride or carbon tetrachloride can be used as the halogen compound. Though simultaneous treatments with the complexing agent and the halogen compound may be feasible, it is possible to first conduct the treatment with the complexing agent and then the treatment with the halogen compound. The treatment with complexing agent is generally effected at a temperature of $-20°-80°$ C. by adding a complexing agent to solid titanium trichloride in a diluent in an amount of 0.2–3 times by mole that of $TiCl_3$. The solid obtained after the treatment with complexing agent is preferably separated and washed. The treatment with halogen compound is generally conducted in a diluent at a temperature of $-10°-50°$ C. The amount of the halogen compound is in the range of 0.1–10 times by mole, preferably 1–5 times by mole, that of $TiCl_3$. After the treatment with halogen compound, the obtained solid is preferably to be separated and washed.

Though it is preferred to prepare the solid titanium trichloride-based catalytic complex according to method (a) or (b), a catalytic complex may be used as prepared, without resorting to the method (a) or (b), by a method described in Japanese Laid-open Patent Publication No. 51-123796. In the method, an ether compound is added to solid titanium trichloride, obtained by reducing titanium tetrachloride with an organic aluminum compound, in an amount by molar ratio to the titanium trichloride of 0.5–5:1, heating the mixture to $50°-120°$ C., and separating the resulting solid from the system to obtain the catalytic complex.

In accordance with the process of the invention, the thus obtained solid titanium trichloride-based catalytic complex is used as the catalyst. It will be noted that pure titanium trichloride ($TiCl_3$) obtained by hydrogen reduction of titanium tetrachloride, titanium trichloride-aluminum trichloride cocrystals ($TiCl_3 \cdot \frac{1}{3}AlCl_3$) obtained by aluminum reduction of titanium tetrachloride and mechanically ground products of similar types of titanium trichloride, as they are, do not yield the remarkable effects exhibited by the present invention and thus are not suitable for use as the catalyst in the process of the invention.

In the practice of the invention, a compound represented by the general formula, $AlR_n^1Cl_{3-n}$ (in which $R^1$ represents a n-propyl group or a n-hexyl group, and n is a value of 1.95–2.10) as described hereinbefore is used as the cocatalyst. It is important to note that, in the above general formula, $1.95 \leq n \leq 2.10$, and within this range the compound can produce good results with respect to polymerization activity and stereospecificity of the polymer when the polymerization is conducted in combination with the above-described solid titanium trichloride-based catalytic complex. These results can not be obtained if $R^1$ is neither n-propyl group nor n-hexyl group, which will be clearly seen from Comparative Examples appearing hereinafter. When a compound of the above formula in which $n > 2.10$ is used, the stereospecificity is lowered to a greater extent as compared with an increase of polymerization activity. On the contrary, when a compound of the formula in which $n < 1.95$ is used, the extent of decrease in polymerization activity becomes much greater than the increase in the stereospecificity. In either case, unfavorable results develope. The organic aluminum compounds which serve as a cocatalyst include those having both the n-propyl group and n-hexyl group as $R^1$ of the above-indicated general formula.

The organic aluminum compound cocatalyst can be prepared by any known method, e.g. by reacting tri-n-propyl-aluminum or tri-n-hexylaluminum with aluminum trichloride or be reacting (a) tri-n-propylaluminum, tri-n-hexylaluminum or aluminum trichloride with (b) a compound represented by the general formula, $AlR_m^2Cl_{3-m}$ (in which $R^2$ represents a n-propyl group or a n-hexyl group, and m is a value of $0 < m < 3$). Further, the organic aluminum compound may be prepared by a combination of the above-described two methods, i.e. by reacting tri-n-propylaluminum or tri-n-hexylaluminum with aluminum trichloride to give a $AlR_m^2Cl_{3-m}$ compound in which m is approximately in the range of 0.9–2.1 and adding small amount of tri-n-propylaluminum, tri-n-hexylaluminum or aluminum trichloride for reaction with the above compound so that a predetermined value of n is obtained.

in the above case, the reaction temperature is in the range of room temperature to $150°$ C., preferably $50°-100°$ C. and the reaction time is in the range of several minutes -several hours, preferably 1–2 hours. Though the reaction is feasible without use of any solvent, it may be conducted in a solvent of an aliphatic hydrocarbon such as n-hexane, n-heptane or the like; an aromatic hydrocarbon such as toluene, xylene or the like; or an alicyclic hydrocarbon such as cyclohexane, methylcyclohexane or the like. When a trialkylaluminum having an alkyl group different from the $R^2$ group of $AlR_m^2Cl_{3-m}$ is used as a reactant to be added in the second reaction step of the combination method, a compound can be obtained which has both the n-hexyl group and the n-propyl group therein.

In accordance with the process of the present invention, an electron-donor compound may be used as a third catalytic component in addition to the above-described catalyst and cocatalyst whereby the produced polymer is improved in stereospecificity without reduction of the polymerization activity. The electron-donor compounds useful for the above purpose are those which contain one or more electron-donor atoms or groups and include, for example, ethers, polyethers, alkylene oxides, furan, amines, trialkylphosphines, triarylphosphines, pyridine, quinoline, phosphoric acid esters, phosphoric acid amides, phosphine oxides, trialkylphosphites, triarylphosphites, ketones, carboxylic acid esters, carboxylic acid amides and the like. Of these, carboxylic acid esters such as ethyl benzoate, methyl benzoate, phenyl acetate, etc.; glycine esters such as dimethylglycine ethyl ester, dimethylglycine phenyl ester, etc.; and triarly phosphites such as triphenyl phosphite, trinonylphenyl phosphite, etc. are preferably used.

The ratio of the catalytic components is as follows: The mole ratio of titanium trichloride contained in the solid titanium trichloride-based catalytic complex to an organic aluminum compound is in the range of 1:1–100, preferably 1:2–40. When the above-described third catalytic component is used, the mole ratio of the titanium trichloride to the third catalytic component is in the range of 1:0.01–10, preferably 1:0.05–2.

Further, aromatic hydrocarbons such as benzene, toluene and xylene are usable as the third catalytic component.

In accordance with the present invention, propylene can by homopolymerized, random copolymerized with other α-olefins in the presence of the catalytic system substantially composed of the solid titanium trichloride-based catalytic complex, the organic aluminum compound and, if necessary, the third catalytic component. Further, propylene and the other α-olefin can be block copolymerized to the above random copolymer and the above homopolymer or random copolymer, respectively. In addition, after the block copolymerization, propylene may be further polymerized. Examples of other α-olefins include ethylene, butene-1, 3-methylbutene-1, 4-methylpentene-1, pentene-1, hexene-1, and the like. The process of the invention is particularly suitable for stereospecific polymerization to produce a propylene homopolymer, a random copolymer containing 90 wt % or more of propylene, a block copolymer containing 80 wt % or more of propylene.

The polymerization reaction may be conducted either by vapor phase polymerization or by slurry polymerization using a solvent. Examples of solvents include aliphatic hydrocarbons such as pentane, heptane, hexane, decane, etc.; alicyclic hydrocarbons such as cyclohexane, methylcyclohexane, etc., and aromatic hydrocarbons such as benzene, toluene, etc. In addition, the above-mentioned olefins per se including propylene may be also used as the solvent.

The polymerization reaction is feasible by a batch or continuous manner. Though the polymerization temperature and pressure are not critical, the temperature is generally in the range of 50°–100° C., preferably 60°–90° C. and the pressure is in the range of atmospheric pressure to about 100 atms.

On polymerization, a known molecular weight controlling agent such as hydrogen, a halogenated hydrocarbon or the like may be employed to control the molecular weight of the produced polymer. The solid titanium trichloride-based complex used as the catalyst may be applied for polymerization as it is, but it is preferably pretreated with small amount of the aforeindicated olefin in the presence of the organic aluminum compound. This pretreatment is effective for improving the physical properties of the polymer slurry such as bulk density.

The pretreatment is conducted at a temperature lower than the polymerization temperature, normally at 20°–60° C. in order that the weight ratio of the polymer produced by the pretreatment to the titanium trichloride in the catalytic complex=0.1–50/1, preferably 1–20/1.

The polymerization of propylene is effected in a manner as described hereinbefore. The effects of the high polymerization activity and high stereospecificity attained by the process of the invention become more pronounced especially when the polymerization is conducted at high catalytic efficiency so that a polymer is produced in an amount of, for example, 5,000 grams or more, preferably 10,000 grams or more, per gram of titanium trichloride ($TiCl_3$) in the solid catalytic complex. By this, the amount of the catalyst remaining in the polymer will decrease at a higher level and the polymer is improved in stereospecificity. Thus, a polymerization which ensures such high catalytic efficiency is especially favorable.

According to the process of the invention for polymerizing propylene as described in detail hereinabove, good effects and results concerning the polymerization activity and the stereospecificity of polymer (isotactic index) have been obtained to an extent not experienced in prior art processes. Thus, the present invention is believed to have a great merit from an industrial standpoint.

The present invention will be particularly illustrated by way of Examples and Comparative Examples. In the Examples and Comparative Examples, the catalytic efficiency, C.E., means the amount by gram of produced polypropylene per gram of titanium trichloride in the solid catalytic complex, and the polymerization activity K means the amount by gram of produced polypropylene per hour, $kg/cm^2$ of propylene pressure and gram of the titanium trichloride. The isotactic index, I.I. (%), means the amount of residue (wt %) remaining when a polymer is extracted with boiling n-heptane in the modified Soxhlet extracter for 6 hours. Since the amorphous polymer is soluble in boiling n-heptane, the index, I.I. (%), shows the yield of crystalline polymer.

The melt flow index, M.F.I., of polymer was measured according to the method prescribed in ASTM-D 1238 and the bulk density, $\rho_B$, of polymer was measured by the method prescribed in JIS-K-6721.

COCATALYST-PREPARATORY EXAMPLE 1

[Synthesis of $Al(n-C_3H_7)_nCl_{3-n}$]

120 m moles of purified $ALCL_3$ and 170 ml of purified toluene were charged into a 500 ml three necked flask which had been dried and flushed with nitrogen. Then, 210 m moles of tri-n-propyl-aluminum, $Al(n-C_3H_7)_3$, was gradually added to the slurry at room temperature while agitating. After agitation for 30 minutes at room temperature, the reaction system was heated up to 90° C. and was continually agitated for 4 hours at the temperature. The $AlCl_3$ solid began to disappear during the heating and a colorless, uniform solution was obtained on completion of the reaction. The analysis of Al and Cl in the resulting organic aluminum compound dissolved in the toluene revealed that the aluminum compound had a composition of $Al(n-C_3H_7)_{1.91}Cl_{1.09}$.

The solution was divided into predetermined portions and each portion was placed in a 100 ml three necked flask which was dried and flushed with nitrogen, followed by adding tri-n-propylaluminum, $Al(n-C_3H_7)_3$ so that a predetermined $n-C_3H_7/Al$ ratio was attained and agitation of the solution at 80° C. for 2 hours. After completion of the reaction, a colorless, uniform solution was obtained. The reaction conditions are shown in Table 1.

COCATALYST-PREPARATORY EXAMPLE 2

[Synthesis of $Al(n-C_6H_{13})_nCl_{3-n}$]

Into a 500 ml three-necked flask which had been dried and flushed with nitrogen were charged 120 m moles of purified $AlCl_3$ and 164 ml of purified toluene. While agitating the slurry, 207 m moles of tri-n-hexylaluminum, $Al(n-C_6H_{13})_3$, was gradually added to the slurry at room temperature. After agitation for 30 minutes at room temperature, the reaction system was heated up to 90° C. and was continually agitated for an additional 2 hours at the temperature. Upon heating, the $AlCl_3$ solid began to disappear and a colorless, uniform solution was obtained on completion of the reaction.

The analysis for Al and Cl of an organic aluminum compound dissolved in the toluene revealed that the compound had a composition of $Al(n-C_6H_{13})_{1.90}Cl_{1.10}$.

The solution was divided into predetermined portions and each portion was placed in a 100 ml three-necked flask which had been dried and flushed with nitrogen, followed by addition of tri-n-hexylaluminum, $Al(n-C_6H_{13})_3$, so that a predetermined $n-C_6H_{13}/Al$ ratio was attained and agitation at 80° C. for 2 hours. After completion of the reaction, a colorless, uniform solution was obtained. The reaction conditions are shown in Table 2.

TABLE 1

| Starting Material | | | |
|---|---|---|---|
| $Al(n-C_3H_7)_{1.91}Cl_{1.09}$ m mole | $Al(n-C_3H_7)_3$ m mole | Reaction °C. - hrs. | n in $Al(n-C_3H_7)_nCl_{3-n}$ |
| 30.0 | 1.14 | 80–2 | 1.95 |
| " | 3.71 | " | 2.03 |
| " | 4.42 | " | 2.05 |
| " | 6.33 | " | 2.10 |
| " | 2.70 | " | 2.00 |
| " | 8.47 | " | 2.15 |

TABLE 2

| Starting Material | | Reaction | |
|---|---|---|---|
| $Al(n-C_6H_{13})_{1.90}Cl_{1.10}$ m mole | $Al(n-C_6H_{13})_3$ m mole | °C. - hrs. | n in $Al(n-C_6H_{13})_nCl_{3-n}$ |
| 20.0 | 0.95 | 80–2 | 1.95 |
| " | 3.16 | " | 2.05 |
| " | 2.00 | " | 2.00 |
| " | 5.88 | " | 2.15 |

COCATALYST-PREPARATORY EXAMPLE 3

[Synthesis of $Al(C_2H_5)_nCl_{3-n}$]

Into a 100 ml three-necked flask which had been dried and flushed with nitrogen was charged with 20 ml of a purified toluene solution containing 20.0 m moles of $Al(C_2H_5)_{1.5}Cl_{1.5}$.

To the solution was gradually added a purified toluene solution containing $Al(C_2H_5)_3$ in different amounts indicated in Table 3 at room temperature while agitating the solution. The mixture was continuously agitated at room temperature for an additional 30 minutes and then at 90° C. for 4 hours. The reaction conditions are shown in Table 3.

TABLE 3

| Starting Material | | | |
|---|---|---|---|
| $Al(C_2H_5)_{1.5}Cl_{1.5}$ m mole | $Al(C_2H_5)_3$ m mole | Reaction °C. - Hrs. | n in $Al(C_2H_5)_nCl_{3-n}$ |
| 20.0 | 8.57 | 90–4 | 1.95 |
| " | 11.58 | " | 2.05 |
| " | 13.33 | " | 2.10 |
| " | 10.00 | " | 2.00 |

CATALYST-PREPARATORY EXAMPLE 1

(Preparation of solid titanium trichloride-based catalytic complex)

(A) Preparation of homogeneous titanium trichloride solution

Into a 500 ml four-necked flask which had been dried and flushed with dry argon were charged 150 ml of purified toluene and 90 m moles of titanium tetrachloride, followed by 77 m moles of di-n-butyl ether. The titanium tetrachloride and the di-n-butyl ether were reacted with each other with the attendant slight generation of heat, and dissolved uniformly in the toluene to give an orange yellow uniform solution. To the solution was gradually added a solution of 45 m moles of diethylaluminum monochloride in 20 ml of toluene while maintaining the solution at 25° C. under agitation thereby obtaining a dark orange homogeneous solution of titanium trichloride.

(B) Precipitation of titanium trichloride and preparation of catalyst

When the homogeneous solution of titanium trichloride obtained in the above step (A) was heated up to 95° C., it was recognized that purple titanium trichloride precipitated upon heating.

After being agitated at 95° C., for 30 minutes, the precipitate was separated by filtration and washed once with 100 ml of toluene and five times with 100 ml of n-heptane to obtain a fine particulate purple titanium trichloride-based catalytic complex. As a result of the elementary analysis, it was found that the catalytic complex had a composition of the formula:

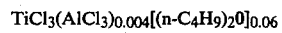

$TiCl_3(AlCl_3)_{0.004}[(n-C_4H_9)_2O]_{0.06}$

When the X-ray diffraction spectra of the catalytic complex were measured with use of a CuKα ray, it was found that a halo of a maximum intensity appeared at $2\theta=32.9°$.

CATALYST-PREPARATORY EXAMPLE 2

(Preparation of solid titanium trichloride-based catalytic complex)

(A) Preparation of homogeneous titanium trichloride solution

Into a 500 ml four-necked flask which had been sufficiently dried and flushed with dry argon were charged 120 ml of n-heptane and 100 m moles of titanium tetrachloride, followed by 93 m moles of di-n-octyl ether. Then, a solution of 33 m moles of diethylaluminum monochloride in 50 ml of n-heptane was gradually added to the solution while agitating at 25° C., thereby obtaining a greenish dark brown homogeneous solution of titanium trichloride in n-neptane.

(B) Formation of precipitate of titanium trichloride and preparation of catalyst The homogeneous titanium trichloride solution obtained in the above step (A) was heated up to 95° C., during which time a purple titanium trichloride precipitate was formed.

After being agitated at 95° C. for 30 minutes, the precipitate was separated by filtration and washed with 100 ml of n-heptane five times to obtain a fine particulate, purple, solid titanium trichloride-based catalytic complex. As a result of the elementary analysis, it was found that the catalytic complex had a composition of the formula:

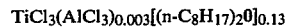

$TiCl_3(AlCl_3)_{0.003}[(n-C_8H_{17})_2O]_{0.13}$

When the X-ray diffraction spectra of the complex were measured by the use of a CuKα ray, it had a halo of a maximum intensity of $2\theta=32.9°$.

CATALYST-PREPARATORY EXAMPLE 3

(Preparation of solid titanium trichloride-based catalytic complex)

(A) Preparation of reduced solid material 45 ml of n-hexane and 100 m moles of titanium tetrachloride were charged into a 500 ml four-necked flask whose atmosphere had been replaced by argon and cooled to 0° C. and into which was dropped a solution composed of 70 ml of n-hexane and 200 m moles of ethylaluminum sesquichloride over 30 minutes under agitation. After addition of the reagents, the agitation was continued for aging at 0° C. for a further 2 hours, followed by washing with 100 ml of n-hexane five times to obtain 21 g of a reddish purple solid substance.

(B) Treatment with complexing agent 150 ml of n-hexane and 21 ml of diisoamyl ether were added to the reddish purple solid substance obtained in above step (A) for reaction at 30° C. for 1 hour under agitation. Then, the solid substance was washed with 100 ml of n-hexane five times and dried under reduced pressure to obtain 21 g of a brown substance.

(C) Treatment with titanium tetrachloride

Titanium tetrachloride was added to the brown substance obtained in the above step (B). After reaction at 35° C. for 1.5 hours, the resulting reaction product was washed with 100 ml of n-hexane eight times to obtain about 20 g of a purple solid titanium trichloride-based catalytic complex. As a result of the elementary analysis, the complex was found to have a composition of the formula, $TiCl_3 \cdot (AlCl_3)_{0.01}[(i-C_5H_{11})_2O]_{0.11}$. When the X-ray diffraction spectra of the complex were measured using a CuK$\alpha$ ray, a halo of a maximum intensity was found at $2\theta = 32.9°$.

CATALYST-PREPARATORY EXAMPLE 4

(Preparation of solid titanium trichloride-based catalytic complex)

(A) Preparation of homogeneous titanium trichloride solution 2.5 m moles of titanium tetraiodide and 34.5 m moles of titanium tetrachloride were charged into a 500 ml four-necked flask the atmosphere of which had been replaced by dry nitrogen. The molar ratio of titanium tetraiodide to titanium tetrachloride was 0.07:1. Then, 60 ml purified toluene was introduced into the mixture, followed by treatment at 100° C. for 2 hours under agitation and cooling. When the inner temperature was lowered to 25° C., 37 m moles of di-n-butyl ether was added under agitation. Ten minutes after the addition, 18.5 m moles of diethylaluminum monochloride was gradually added to give a homogeneous dark brown solution.

(B) Formation of precipitate of titanium trichloride and preparation of catalyst.

When the homogeneous titanium trichloride solution obtained in the above step (A) was heated to 95° C., it was recognized that a purple precipitate of titanium trichloride was formed during heating. After agitation at 95° C. for 30 minutes, the precipitate was separated by filtration and washed with 100 ml of toluene once and then 100 ml of n-heptane four times to obtain a fine particulate, purple titanium trichloride-based catalytic complex. When analyzed, the precipitate was found to contain 0.01 gram atoms of Al and 0.11 moles of di-n-butyl ether per gram atom of Ti.

Catalyst-preparatory Example 5
(Preparation of solid titanium trichloride-based catalytic complex)

The procedure of the step (A) of Catalyst-preparatory Example 1 was repeated except that 90 m moles of di-n-butyl thioether was used instead of 77 m moles of di-n-butyl ether, thereby obtaining a homogeneous titanium trichloride solution. This solution was then treated in the same manner as in the step (B) of the Catalyst-preparatory Example 1 to obtain a fine particulate purple titanium trichloride-based catalytic complex.

When analyzed, the complex was found to contain 0.006 gram atoms of Al and 0.05 moles of di-n-butyl thioether per gram atom of Ti.

EXAMPLES 1–5 AND COMPARATIVE EXAMPLES 1–2

The polymerization of propylene was conducted in high catalytic efficiency in an induction-agitated, 3l autoclave by the use of the solid titanium trichloride-based catalytic complex obtained in the Catalyst-preparatory Example 1 as follows. The various types of cocatalysts obtained in the Cocatalyst-preparatory Example 1 were each charged into an autoclave which had been sufficiently dried under vacuum, and flushed with nitrogen.

Then, 0.6 kg/cm$^2$ of hydrogen gas was fed into the autoclave and 800 g of liquefied propylene was passed thereinto, followed by heating the autoclave. When the inner temperature of the autoclave reached 75° C., a n-hexane slurry containing the solid titanium trichloride-based catalytic complex obtained in the Catalyst-preparatory Example 1 was forced into the system by entrainment with a pressurized nitrogen gas while agitating. The time at which the complex disappeared was regarded as the start of the polymerization reaction. The polymerization reaction was continued at 75° C. for 5 hours under agitation. After completion of the polymerization, an excess of propylene was expelled to obtain white powdery polypropylene. The polymerization conditions and results are shown in Table 4.

COMPARATIVE EXAMPLES 3–6

Various types of the cocatalysts obtained in the Cocatalyst-preparatory Example 3 were each charged into a 3l autoclave which had been sufficiently dried under vacuum and substituted with nitrogen.

0.6 kg/cm$^2$ of hydrogen gas first fed into the autoclave and then 800 g of liquefied propylene was fed thereininto, followed by heating the autoclave. When the inner temperature of the autoclave reached 75° C., an n-hexane slurry containing the solid titanium trichloride-based catalytic complex obtained in the Catalyst-preparatory Example 1 was forced into the system by entrainment with a pressurized nitrogen gas while agitating. The time at which the complex disappeared was regarded as the start of the polymerization reaction. The reaction was continued while agitating at 75° C. for 5 hours. After completion of the polymerization, excess propylene was expelled to obtain white powdery polypropylene. The polymerization conditions and test results are shown in Table 5.

TABLE 4

| | amount of titanium trichloride in solid titanium trichloride-based catalytic complex mg | cocatalyst Al(n-C$_3$H$_7$)$_n$Cl$_{3-n}$ value of n | amount m mole | yield of polypropylene g | C.E. | K | I.I. % | $\rho_B$ g/cc | M.F.I. g/10 min. |
|---|---|---|---|---|---|---|---|---|---|
| Example 1 | 18.5 | 1.95 | 2.0 | 390 | 21100 | 126 | 95.7 | 0.35 | 3.6 |
| Example 2 | 18.7 | 2.03 | " | 441 | 23600 | 141 | 94.1 | 0.34 | 5.3 |
| Example 3 | 21.5 | 2.05 | " | 535 | 24900 | 149 | 94.2 | 0.33 | 3.2 |
| Example 4 | 20.5 | 2.10 | " | 494 | 24100 | 144 | 93.8 | 0.34 | 2.5 |
| Example 5 | 18.3 | 2.00 | " | 399 | 21800 | 130 | 94.7 | 0.34 | 5.1 |
| Comparative Example 1 | 20.5 | 1.91 | " | 269 | 13100 | 78 | 95.6 | 0.35 | 4.7 |
| Comparative Example 2 | 16.5 | 2.15 | " | 401 | 24300 | 145 | 90.8 | 0.34 | 1.8 |

TABLE 5

| | amount of titanium trichloride in solid titanium trichloride-based catalyic complex mg | cocatalyst Al(C$_2$H$_5$)$_n$Cl$_{3-n}$ value of n | amount m mole | yield of polypropylene g | C.E. | K | I.I. % | $\rho_B$ g/cc | M.I.F. g/10 min. |
|---|---|---|---|---|---|---|---|---|---|
| Comparative Example 3 | 23.5 | 1.95 | 2.0 | 317 | 13500 | 81 | 92.1 | 0.33 | 2.6 |
| Comparative Example 4 | 20.9 | 2.00 | " | 353 | 16900 | 101 | 92.3 | 0.33 | 2.5 |
| Comparative Example 5 | 15.3 | 2.05 | " | 295 | 19300 | 115 | 83.1 | 0.29 | 4.5 |
| Comparative Example 6 | 24.5 | 2.10 | " | 470 | 19200 | 115 | 80.2 | 0.26 | 3.1 |

EXAMPLES 6–8 AND COMPARATIVE EXAMPLES 7–8

Various types of the cocatalysts obtained in Cocatalyst-preparatory Example 2 were each charged into a 3l autoclave which had been sufficiently dried under vacuum and flushed with nitrogen.

Thereafter, 0.6 kg/cm$^2$ of hydrogen and then 800 g of liquefied propylene were charged into the autoclave, followed by heating the autoclave. When the inner temperature of the autoclave reached 75° C. in an n-hexane slurry containing the solid titanium trichloride-based catalytic complex obtained in Catalyst-preparatory Example 1 was forcibly carried into the system by entrainment with pressurized nitrogen gas while agitating. The time at which the complex was completely discharged into the autoclave was regarded as the start of polymerization. The polymerization reaction was continued while agitating at 75° C. for 5 hours. After completion of the polymerization, excess of propylene was expelled to obtain white powdery polypropylene. The polymerization conditions and test results are shown in Table 6.

EXAMPLES 9–11

The polymerization of propylene was conducted with high catalytic efficiency in an induction-agitated, 3l autoclave using the solid titanium trichloride-based catalytic complex obtained in the Catalyst-perparatory Example 2 as follows.

Various types of the cocatalysts obtained in the Cocatalyst-preparatory Example 1 were each charged into an autoclave which had been sufficiently dried under vacuum and flushed with nitrogen.

Thereafter, 0.6 kg/cm$^2$ of hydrogen gas and then 800 g of liquefied propylene were charged, followed by heating the autoclave. When the inner temperature of the autoclave reached 75° C., an n-hexane slurry containing the solid titanium trichloride-based catalytic complex obtained in the Catalyst-preparatory Example 2 was forced into the autoclave by entrainment with pressurized nitrogen gas under agitation. The time at which the complex was completely discharged into the autoclave was regarded as the start of polymerization. The polymerization reaction was continued while agitating at 75° C. for 5 hours. After completion of the polymerization, excess propylene was expelled to obtain white powdery polypropylene. The polymerization conditions and test results are shown in Table 7.

TABLE 6

| | amount of titanium trichloride on solid titanium trichloride-based catalytic complex mg | cocatalyst Al(n-C$_6$H$_{13}$)$_n$Cl$_{3-n}$ value of n | amount m mole | yield of polypropylene g | C.E. | K | I.I. % | $\rho_B$ g/cc | M.F.I. g/10 min. |
|---|---|---|---|---|---|---|---|---|---|
| Example 6 | 21.5 | 1.95 | 2.0 | 501 | 23300 | 139 | 95.3 | 0.33 | 3.1 |
| Example 7 | 19.5 | 2.05 | " | 515 | 26400 | 158 | 92.2 | 0.34 | 5.2 |
| Example 8 | 20.8 | 2.00 | " | 491 | 23600 | 141 | 94.1 | 0.34 | 2.4 |
| Comparative | | | | | | | | | |

TABLE 6-continued

| | amount of titanium trichloride on solid titanium trichloride-based catalytic complex mg | cocatalyst Al(n-C$_6$H$_{13}$)$_n$Cl$_{3-n}$ value of n | amount m mole | yield of polypropylene g | C.E. | K | I.I. % | $\rho_B$ g/cc | M.F.I. g/10 min. |
|---|---|---|---|---|---|---|---|---|---|
| Example 7 | 23.5 | 1.90 | " | 343 | 14600 | 87 | 95.2 | 0.33 | 4.4 |
| Comparative Example 8 | 16.7 | 2.15 | " | 412 | 24700 | 147 | 90.0 | 0.34 | 3.2 |

TABLE 7

| | amount of titanium trichloride in solid titanium trichloride-based catalytic complex mg | cocatalyst Al(n-C$_3$H$_7$)$_n$Cl$_{3-n}$ value of n | amount m mole | yield of polypropylene g | C.E. | K | I.I. % | $\rho_B$ g/cc | M.F.I. g/10 min. |
|---|---|---|---|---|---|---|---|---|---|
| Example 9 | 27.8 | 1.95 | 2.0 | 456 | 16400 | 98 | 94.5 | 0.47 | 5.2 |
| Example 10 | 28.1 | 2.05 | " | 570 | 20300 | 121 | 93.1 | 0.46 | 1.7 |
| Example 11 | 24.5 | 2.00 | " | 439 | 17900 | 107 | 93.8 | 0.47 | 3.3 |

EXAMPLES 12-14

The polymerization of propylene was conducted in high catalytic efficiency in an induction-agitated, 3l autoclave using the solid titanium trichloride-based catalytic complex obtained in Catalyst-preparatory Example 3 as follows.

First, various types of the cocatalysts obtained in Cocatalyst-preparatory Example 1 were each charged into an antoclave which had been sufficiently dried under vacuum and flushed with nitrogen.

Then, 0.6 kg/cm$^2$ of hydrogen gas and then 800 g of liquefied propylene were charged, followed by heating the autoclave. When the inner temperature of the autoclave reached 75° C., an n-hexane slurry containing the solid titanium trichloride-based catalytic complex obtained in Catalyst-Preparatory Example 3 was forced into the system by entrainment with pressurized nitrogen gas under agitation. This time was regarded as the start of polymerization. The polymerization reaction was continued while agitating at 75° C. for 5 hours. After completion of the polymerization, excess propylene was expelled to obtain white powdery polypropylene. The polymerization conditions and test results are shown in Table 8.

EXAMPLES 15-17

Various types of the cocatalysts obtained in Cocatalyst-preparatory Example 1 and various types of the third components indicated in Table 9 were, respectively, charged into a 3l autoclave which had been sufficiently dried under vacuum and flushed with nitrogen.

There were charged 0.6 kg/cm$^2$ of hydrogen gas and then 800 g of liquefied propylene, followed by heating the autoclave. When the inner temperature of the autoclave reached 75° C., an n-hexane slurry containing the solid titanium trichloride-based catalytic complex obtained in Catalyst-preparatory Example 1 was forced into the system under agitation by entrainment with pressurized nitrogen gas. This point was regarded as the start of polymerization. The polymerization reaction was continued while agitating at 75° C. for 5 hours. After completion of the polymerization, excess propylene was expelled to give white powdery polypropylene. The polymerization conditions and test results are shown in Table 9.

TABLE 8

| | amount of titanium trichloride in solid titanium trichloride-based catalytic complex mg | cocatalyst Al(n-C$_3$H$_7$)$_n$Cl$_{3-n}$ value of n | amount m mole | yield of polypropylene g | C.E. | K | I.I. % | $\rho_B$ g/cc | M.F.I. g/10 min. |
|---|---|---|---|---|---|---|---|---|---|
| Example 12 | 30.8 | 1.95 | 2.0 | 465 | 15100 | 90 | 92.5 | 0.42 | 3.3 |
| Example 13 | 31.3 | 2.05 | " | 529 | 16900 | 101 | 89.1 | 0.37 | 5.7 |
| Example 14 | 29.7 | 2.00 | " | 463 | 15600 | 93 | 91.3 | 0.40 | 4.9 |

TABLE 9

| | amount of titanium trichloride in solid titanium trichloride-based catalytic complex mg | cocatalyst Al(n-C$_3$H$_7$)$_n$Cl$_{3-n}$ value of n | amount m mole | third component amount | yield of polypropylene g | C.E. | K | I.I. % | $\rho_B$ g/cc | M.F.I. g/10 min. |
|---|---|---|---|---|---|---|---|---|---|---|
| Example 15 | 18.5 | 2.05 | 2.0 | ethyl benzoate 0.036 m moles | 435 | 23500 | 140 | 96.8 | 0.35 | 3.1 |
| Example 16 | 18.9 | " | " | phenyl acetate | 437 | 23100 | 138 | 97.4 | 0.34 | 1.6 |

TABLE 9-continued

| | amount of titanium trichloride in solid titanium trichloride-based catalytic complex mg | cocatalyst Al(n-C$_3$H$_7$)$_n$Cl$_{3-n}$ value of n | amount m mole | third component amount | yield of polypropylene g | C.E. | K | I.I. % | ρ$_B$ g/cc | M.F.I. g/10 min. |
|---|---|---|---|---|---|---|---|---|---|---|
| Example 17 | 21.3 | " | " | 0.018 m moles toluene 20 ml | 509 | 23900 | 143 | 97.2 | 0.35 | 2.3 |

EXAMPLES 18–22 AND COMPARATIVE EXAMPLES 9–10

Propylene was polymerized in the same manner as in Example 1 except that there were used the solid titanium trichloride-based catalytic complex obtained in Catalyst-preparatory Example 4 and various types of the cocatalyst obtained in Cocatalyst-preparatory Example 1. The polymerization conditions and test results are shown in Table 10.

ether. The titanium tetrachloride and the di-n-butyl ether were reacted with each other with a slight generation of heat uniformly dissolved in toluene to give a homogeneous orange yellow solution. To the solution was gradually added a solution of 45 m moles of diethylaluminum monochloride in 20 ml of toluene while the solution was kept at 25° C. under agitation thereby obtaining a uniform dark orange solution of titanium trichloride.

TABLE 10

| | amount of titanium trichloride in solid titanium trichloride-based catalytic complex mg | cocatalyst Al(n-C$_3$H$_7$)$_n$Cl$_{3-n}$ value of n | amount m mole | yield of polypropylene g | C.E. | K | I.I. % | ρ$_B$ g/cc | M.F.I. g/10 min. |
|---|---|---|---|---|---|---|---|---|---|
| Example 18 | 15.3 | 1.95 | 2.0 | 360 | 23500 | 140 | 97.0 | 0.35 | 2.1 |
| Example 19 | 12.8 | 2.03 | " | 330 | 25800 | 154 | 96.1 | 0.34 | 3.9 |
| Example 20 | 14.9 | 2.05 | " | 387 | 26000 | 155 | 97.0 | 0.34 | 2.0 |
| Example 21 | 17.1 | 2.10 | " | 446 | 26100 | 156 | 95.7 | 0.34 | 8.5 |
| Example 22 | 15.6 | 2.00 | " | 368 | 23600 | 141 | 97.0 | 0.34 | 8.2 |
| Comparative Example 9 | 15.7 | 1.91 | " | 261 | 16600 | 99 | 96.8 | 0.34 | 7.3 |
| Comparative Example 10 | 13.9 | 2.15 | " | 377 | 27100 | 162 | 93.5 | 0.34 | 14.1 |

EXAMPLES 23–26

Propylene was polymerized in the same manner as in Example 1 except that there were used the solid titanium trichloride-based catalytic complex obtained in Catalyst-preparatory Example 5 and various types of the cocatalysts obtained in Cocatalyst-preparatory Example 1. The polymerization conditions and test results are shown in Table 11.

(B) Formation of precipitate of titanium trichloride and preparation of catalyst When the homogeneous titanium trichloride solution obtained in the above step (A) was heated up to 95° C. it was recognized that a purple titanium trichloride preciptate was formed during the heating. After agitation at 95° C. for 60 minutes, the precipitate was separated by filtration and washed with 100 ml of n-heptane five times to obtain a fine particulate purple titanium

TABLE 11

| | amount of titanium trichloride in solid titanium trichloride-based catalytic complex mg | cocatalyst Al(n-C$_3$H$_7$)$_n$Cl$_{3-n}$ value of n | amount m mole | yield of polypropylene g | C.E. | K | I.I. % | ρ$_B$ g/cc | M.F.I. g/10 min. |
|---|---|---|---|---|---|---|---|---|---|
| Example 23 | 25.1 | 1.95 | 2.0 | 422 | 16800 | 100 | 95.6 | 0.31 | 8.8 |
| Example 24 | 23.4 | 2.05 | " | 365 | 15600 | 93 | 95.0 | 0.30 | 1.3 |
| Example 25 | 20.2 | 2.10 | " | 380 | 18800 | 112 | 92.6 | 0.30 | 5.1 |
| Example 26 | 18.5 | 2.00 | " | 303 | 16400 | 98 | 94.3 | 0.30 | 4.5 |

CATALYST-PREPARATORY EXAMPLE 6

(Preparation of solid titanium trichloride-based catalytic complex)

(A) Preparation of homogeneous titanium trichloride solution

There were charged 150 ml of purified toluene and 90 m moles of titanium tetrachloride into a 500 ml four-necked flask which had been dried and flushed with dry argon, followed by adding 68 m moles of di-n-butyl trichloride-based catalytic complex. When subjected to an elementary analysis, it was found that the catalytic complex had a composition of the formula,

When the X-ray diffraction spectra of the complex were measured by the use of a CuKα ray, a halo of a maximum intensity was found to be at 2θ = 32.9°.

EXAMPLE 27

The polymerization of propylene was conducted, as follows, in high catalytic efficiency in an induction-agitated, 3l autoclave using the solid titanium trichloride-based catalytic complex obtained in Catalyst-preparatory Example 6. There were introduced the solid titanium trichloride-based catalytic complex obtained in Catalyst-preparatory Example 6 in an amount of 20.0 mg calculated as titanium trichloride and 1.3 ml of an n-hexane solution of di-n-propylaluminum monochloride with a concentration of 0.5 m moles/ml into the autoclave which had been sufficiently dried under vacuum and flushed with nitrogen. 0.6 kg/cm² of hydrogen gas was charged into the autoclave and 800 g of liquefied propylene was further charged, followed by polymerization at 70° C. for 3 hours. After completion of the polymerization, excess propylene was expelled to obtain 473 g of white powdery polypropylene. The catalytic efficiency, C.E. was found to be 23650, and the polymerization activity, K, was 263, and the polymer was found to have bulk density of 0.39 g/cc, an I.I. value of 94.9% and an M.F.I. value of 2.6.

COMPARATIVE EXAMPLES 11–14

Example 27 was repeated using, instead of di-n-propylaluminum monochloride, di-n-butylaluminum monochloride, di-i-butylaluminum monochloride, diethylaluminum monochloride, or di-n-octylaluminum monochloride. The test results are shown in Table 12.

EXAMPLE 28

Example 27 was repeated using di-n-hexylaluminum monochloride instead of di-n-propylaluminum monochloride. The test results are shown in Table 12 together with those of Example 27 and Comparative Examples 11–14.

EXAMPLES 29–31 AND COMPARATIVE EXAMPLES 15–16

There was provided a 3, induction-agitated autoclave which had been sufficiently dried under vacuum and flushed with nitrogen, into which were charged the solid titanium trichloride-based catalytic complex, obtained in Catalyst-preparatory Example 6, in an amount of 20.0 g calculated as titanium trichloride, each of the organic aluminum compounds indicated in Table 13, and an electron-donor compound. There were charged 0.6 kg/cm² of hydrogen and then 800 g of liquefied propylene, followed by polymerization at 70° C. for 3 hours. The test results are shown in Table 13.

TABLE 13

| No. | type of organic aluminium compound | type and amount of electron-donor compound | C.E. | K | bulk density g/cc | I.I. % | M.F.I. g/10 min. |
|---|---|---|---|---|---|---|---|
| Example 29 | di-n-propylaluminum monochloride | phenyl acetate 0.013 m moles | 23480 | 261 | 0.39 | 97.5 | 3.5 |
| Example 30 | di-n-propylaluminum monochloride | ethyl benzoate 0.013 m moles | 23520 | 261 | 0.39 | 97.1 | 1.8 |
| Example 31 | di-n-propylaluminum monochloride | triphenylphosphite 0.013 m moles | 22950 | 255 | 0.39 | 97.6 | 4.1 |
| Comparative Example 15 | diethylaluminum monochloride | phenyl acetate 0.013 m moles | 16080 | 179 | 0.39 | 96.1 | 3.2 |
| Comparative Example 16 | diethylaluminum monochloride | ethyl benzoate 0.013 m moles | 15400 | 171 | 0.39 | 96.0 | 2.9 |

CATALYST-PREPARATORY EXAMPLE 7 (PREPARATION OF SOLID TITANIUM TRICHLORIDE-BASED CATALYTIC COMPLEX)

(A) Preparation of homogeneous titanium trichloride solution

There were charged 125 ml of n-heptane and 100 m moles of titanium tetrachloride into a 500 ml four necked flask which had been sufficiently dried and flushed with dry argon, to which was added 150 m moles of di-n-dodecyl ether. The mixture was kept at 25° C. under agitation, into which was gradually dropped a solution of 50 m moles of triethylaluminum in 50 ml n-heptane thereby obtaining a homogeneous n-heptane solution of greenish dark brown titanium trichloride.

(B) Formation of precipitate of titanium trichloride and preparation of catalyst The homogeneous titanium trichloride solution obtained in the above step (A) was maintained at 60° C., to which was gradually added 100 m moles of titanium tetrachloride. Immediately after the addition, a purple precipitate of titanium trichloride was recognized to be

TABLE 12

| No. | type of organic aluminium compound | C.E. | K | bulk density g/cc | I.I. % | M.F.I. g/10 min. |
|---|---|---|---|---|---|---|
| Example 27 | di-n-propylaluminum monochloride | 23650 | 263 | 0.39 | 94.9 | 2.6 |
| Example 28 | di-n-hexylaluminum monochloride | 25270 | 281 | 0.39 | 94.8 | 1.3 |
| Comparative Example 11 | di-n-butylaluminum monochloride | 10350 | 115 | 0.39 | 90.2 | 3.5 |
| Comparative Example 12 | di-i-butylaluminum monochloride | 15740 | 175 | 0.39 | 94.1 | 2.1 |
| Comparative Example 13 | di-n-octylaluminum monochloride | 14350 | 159 | 0.34 | 76 | 1.6 |
| Comparative Example 14 | diethylaluminum monochloride | 18050 | 201 | 0.39 | 93.6 | 1.5 | formed. To complete the precipitate formation reaction, the system was kept at 60° C. for 20 minutes. Then, the precipitate of the titanium trichloride was separated by filtration and washed with 100 ml of n-hexane five times to obtain a purple solid titanium trichloride-based catalytic complex.

When analyzed by an elementary analysis, the catalytic complex was found to have a composition of the formula, $$TiCl_3(AlCl_3)_{0.005}[(n-C_{12}H_{25})_2O]_{0.11}.$$

When the X-ray diffraction spectra of this complex were measured by the use of CuKα ray, it was found that a halo of a maximum intensity appeared at $2\theta=32.9°$.

EXAMPLE 32

Into a 3 l, induction-agitated autoclave which had been sufficiently dried, reduced to vacuum and flushed with nitrogen were charged the solid titanium trichloride-based catalytic complex, obtained in Catalyst-preparatory Example 7, in an amount of 20.0 mg calculated as titanium trichloride and 1.3 ml of an n-hexane solution of di-n-propylaluminum monochloride with a concentration of 0.5 m moles/ml. There were charged 0.6 kg/cm² of hydrogen gas and then 800 g of liquefied propylene, followed by polymerization at 70° C. for 3 hours. After completion of the polymerization, excess propylene was expelled to obtain 358 g of white powdery polypropylene. The test results are shown in Table 14.

COMPARATIVE EXAMPLE 17

The polymerization was conducted in the same manner as in Example 32 except that diethylaluminum monochloride was used instead of di-n-propylaluminum monochloride. The test results are shown in Table 14.

EXAMPLE 33

The polymerization was conducted in the same manner as in Example 32 except that di-n-hexylaluminum monochloride was used instead of di-n-propylaluminum monochloride, with the results shown in Table 14.

polymerization, excess propylene was expelled to obtain 302 g of white powdery polypropylene.

In the above case, the catalytic efficiency, C.E., was found to be 15,100 and the polymerization activity, K. was 168. The polymer was found to have a bulk density of 0.41 g/cc, and I.I. of 91.5% and an M.F.I. of 2.7.

COMPARATIVE EXAMPLE 18

The polymerization was conducted in the same manner as in Example 34 using diethylaluminum monochloride instead of di-n-propylaluminum monochloride, thereby obtaining 252 g of polypropylene. In this case, the C.E. was found to be 12600 and the K was 140. The polymer had a bulk density of 0.40 g/cc, an I.I. of 90.5% and an M.F.I. of 3.5 g/10 min.

COMPARATIVE EXAMPLE 19

The polymerization was conducted in the same manner as in Example 27 using 100 mg of commercially available titanium trichloride, $TiCl_3(AlCl_3)_{0.33}$, produced by Stawfer Co., Ltd., instead of the solid titanium trichloride-based catalytic complex obtained in Catalyst-preparatory Example 6.

The C.E. and K were found to be 2268 and 25, respectively, and the polymer had a bulk density of 0.38 g/cc, an I.I. or 88.7% and an M.F.I. of 4.5 g/10 min.

EXAMPLE 35 AND COMPARATIVE EXAMPLES 20 and 21

With use of the solid titanium trichloride-based catalytic complex obtained by Catalyst preparatory Example 3 and the co-catalyst obtained by Co-catalyst Preparatory Example 1, propylene polymerization was conducted at a temperature of 75° C. for 5 hours in a manner similar to Example 12 to 14. The polymerization conditions and the results are shown in Table 15 together with the results of Examples 12 to 14. It is shown that with use of n-propyl aluminum chloride, a polypropylene having a high stereospecificity (I.I.) can be obtained with a high polymerization activity (K) when n is within a range of 1.95 to 2.10. When n is 1.91, the polymerization activity (K) is reduced, and where n is 2.15, the stereospecificity (I.I.) is reduced.

TABLE 14

| No. | type of organic aluminium compound | C.E. | K | bulk density g/cc | I.I. % | M.F.I. g/10 min. |
|---|---|---|---|---|---|---|
| Example 32 | di-n-propylaluminum monochloride | 17900 | 199 | 0.45 | 94.8 | 3.1 |
| Example 33 | di-n-hexylaluminum monochloride | 18350 | 204 | 0.43 | 93.9 | 1.8 |
| Comparative Example 17 | diethylaluminum monochloride | 13300 | 148 | 0.44 | 93.8 | 2.7 |

EXAMPLE 34

There were charged the solid titanium trichloride-based catalytic complex, obtained in Catalyst-preparatory Example 3, in an amount of 20.0 mg calculated as titanium trichloride and 1.3 ml of a n-hexane solution containing 0.5 m moles/ml of di-n-propylaluminum monochloride into a 3 induction-agitated autoclave which had been sufficiently dried, reduced to vacuum and flushed with nitrogen. Thereafter, 0.6 kg/cm² of hydrogen gas and 800 g of liquefied propylene were successively charged into the system, followed by polymerization at 70° C. for 3 hours. After completion of the

EXAMPLES 36 TO 38 AND COMPARATIVE EXAMPLES 22 AND 23

With use of n-hexyl aluminum chloride obtained by Co-catalyst Preparatory Example 2 and the solid titanium trichloride-based catalytic complex obtained by Catalyst Preparatory Example 3, propylene polymerization was conducted at 75° C. for 5 hours in a manner similar to Examples 12 to 14. The polymerization conditions and the results are shown in Table 16. It is shown again that a polypropylene having a high stereospecificity (I.I.) is obtainable with a high polymerization activity (K) when n is in a range of 1.95 to 2.10, and when n is less than 1.95 or more than 2.10, the polymerization activity (K) or the stereospecificity (I.I.) respectively, is reduced.

COMPARATIVE EXAMPLES 24 TO 26

For the purpose of comparison, propylene polymerization was conducted at a temperature of 75° C. ffor 5 hours in a manner similar to Examples 12 to 14 with use of ethyl aluminum chloride obtained by Co-catalyst Preparatory Example 3 and the solid titanium trichloride-based catalytic complex obtained by Catalyst Preparatory Example 3. The polymerization conditions and the results are shown in Table 17. It is shown that both the polymerization activity (K) and the stereospecificity (I.I.) are lower than those obtainable with use of n-propyl aluminum chloride or n-hexyl aluminum chloride. Further, when n is 2.05, the stereospecificity (I.I.) is greatly reduced.

EXAMPLES 39 TO 41

With use of various electron donor components, the propyl aluminum chloride obtained by Co-catalyst Preparatory Example 1 and the solid titanium trichloride-based catalytic complex obtained by Catalyst Preparatory Example 3, propylene polymerization was conducted at a temperature of 75° C. for 5 hours in a manner similar to Examples 15 to 17. The polymerization conditions and the results are shown in Table 18. It is shown that in each case, the reduction in the polymerization activity was small and the stereospecificity increased.

COMPARATIVE EXAMPLES 27 AND 28

For the purpose of comparison, propylene polymerization was conducted at a temperature of 70° C. for 3 hours in a manner similar to Example 34 with use of di-n-butyl aluminum monochloride or di-n-octyl aluminum monochloride and the solid titanium trichloride-based catalytic complex obtained by Catalyst Preparatory Example 3. The polymerization conditions and the results are shown in Table 19 together with the results of Example 34 and Comparative Example 18. It is shown that di-n-propyl aluminum monochloride is superior in both the polymerization activity (K) and the stereospecificity (I.I.).

TABLE 15

|  | Amount of titanium trichloride in solid titanium trichloride-based catalytic complex mg | Cocatalyst Al(n-C$_3$H$_7$)nCl$_{3-n}$ | | Yield of polypropylene g | C.E. | K | I.I. % | $\rho_B$ g/cc | M.F.I. g/10 min |
|---|---|---|---|---|---|---|---|---|---|
|  |  | Value of n | Amount m mole |  |  |  |  |  |  |
| Example 12 | 30.8 | 1.95 | 2.0 | 465 | 15100 | 90 | 92.5 | 0.42 | 3.3 |
| Example 13 | 31.3 | 2.05 | " | 529 | 16900 | 101 | 89.1 | 0.37 | 5.7 |
| Example 14 | 29.7 | 2.00 | " | 463 | 15600 | 93 | 91.3 | 0.40 | 4.9 |
| Example 35 | 28.5 | 2.10 | " | 475 | 16700 | 101 | 90.3 | 0.40 | 3.5 |
| Comparative Example 20 | 30.5 | 1.91 | " | 292 | 9570 | 58 | 93.2 | 0.41 | 3.5 |
| Comparative Example 21 | 30.8 | 2.15 | " | 574 | 18600 | 113 | 87.8 | 0.39 | 4.6 |

TABLE 16

|  | Amount of titanium trichloride in solid titanium trichloride-based catalytic complex mg | Cocatalyst Al(n-C$_6$H$_{13}$)$_n$Cl$_{3-n}$ | | Yield of polypropylene g | C.E. | K. | I.I. % | $\rho_B$ g/cc | M.F.I. g/10 min. |
|---|---|---|---|---|---|---|---|---|---|
|  |  | Value of n | Amount m mole |  |  |  |  |  |  |
| Example 36 | 28.4 | 1.95 | 2.0 | 469 | 16500 | 100 | 91.5 | 0.40 | 4.5 |
| Example 37 | 29.3 | 2.00 | " | 503 | 17200 | 104 | 91.2 | 0.40 | 5.3 |
| Example 38 | 31.5 | 2.10 | " | 587 | 18600 | 113 | 90.2 | 0.40 | 4.8 |
| Comparative Example 22 | 25.3 | 1.90 | " | 271 | 10700 | 65 | 92.8 | 0.40 | 3.4 |
| Comparative Example 23 | 26.5 | 2.15 | " | 455 | 17200 | 104 | 86.2 | 0.38 | 3.8 |

TABLE 17

|  | Amount of titanium trichloride in solid titanium trichloride-based catalytic complex mg | Cocatalyst Al(n-C$_2$H$_5$)$_n$Cl$_{3-n}$ | | Yield of polypropylene g | C.E. | K. | I.I. % | $\rho_B$ g/cc | M.F.I. g/10 min. |
|---|---|---|---|---|---|---|---|---|---|
|  |  | Value of n | Amount m mole |  |  |  |  |  |  |
| Comparative Example 24 | 31.3 | 1.95 | 2.0 | 309 | 9870 | 60 | 88.3 | 0.38 | 4.5 |
| Comparative Example 25 | 35.4 | 2.00 | 2.0 | 421 | 11900 | 72 | 88.0 | 0.38 | 3.1 |
| Comparative Example 26 | 28.9 | 2.05 | 2.0 | 395 | 13700 | 83 | 75.8 | 0.36 | 2.9 |

TABLE 18

| | Amount of titanium trichloride in solid titanium trichloride-based catalyst complex mg | Cocatalyst Al(n-C$_3$H$_7$)$_n$Cl$_{3-n}$ Value of n | Amount m mole | Type and Amount of Electron-Donor Compound | Yield of polypropylene g | C.E. | K | I.I. | $\rho_B$ | M.F.I. |
| --- | --- | --- | --- | --- | --- | --- | --- | --- | --- | --- |
| Example 39 | 21.5 | 2.05 | 2.0 | ethyl benzoate 0.028 m mole | 326 | 15200 | 92 | 93.8 | 0.40 | 3.1 |
| Example 40 | 18.4 | 2.05 | 2.0 | phenyl acetate 0.012 m mole | 267 | 14500 | 88 | 95.2 | 0.40 | 2.5 |
| Example 41 | 18.7 | 2.05 | 2.0 | toluene 20 ml | 320 | 17100 | 104 | 94.5 | 0.40 | 4.8 |

TABLE 19

| | Amount of titanium trichloride in solid titanium trichloride-based catalytic complex mg | Type and amount of organic aluminum compound | Yield of polypropylene g | C.E. | K | I.I. % | $\rho_B$ g/cc | M.F.I. g/10 min. |
| --- | --- | --- | --- | --- | --- | --- | --- | --- |
| Example 34 | 20.0 | Al(n-C$_3$H$_7$)$_{2.00}$Cl$_{1.00}$ 0.65 m mole | 302 | 15100 | 168 | 91.5 | 0.41 | 2.7 |
| Comparative Example 18 | 20.0 | Al(C$_2$H$_5$)$_{2.00}$Cl$_{1.00}$ 0.65 m mole | 252 | 12600 | 140 | 90.5 | 0.40 | 3.5 |
| Comparative Example 27 | 20.2 | Al(n-C$_4$H$_9$)$_{2.00}$Cl$_{1.00}$ 0.65 m mole | 138 | 6830 | 76 | 87.4 | 0.39 | 2.6 |
| Comparative Example 28 | 18.5 | Al(n-C$_8$H$_{17}$)$_{2.00}$Cl$_{1.00}$ 0.65 m mole | 190 | 10300 | 114 | 74.2 | 0.34 | 2.8 |

CATALYST PREPARATORY EXAMPLE 8

(Synthesis of a Solid Titanium Trichloride-Based Catalytic Complex)

(A) Preparation of a Reduced Solid Substance 225 ml of dry, refined n-dodecane and 55 ml of titanium tetrachloride were introduced under an argon atmosphere into a one liter flask. The titanium tetrachloride solution was cooled to a temperature of −5° C. While stirring, a homogeneous solution of 350 ml of n-dodecane and 115 ml of ethyl aluminum sesquichloride was gradually added within 3 hours to the titanium tetrachloride solution. During this period, the temperature of the reaction system was maintained at −5° C. To complete the reaction, the reaction mixture was kept at a temperature of −5° C. for further 2 hours while stirring. Thereafter, the solid phase was separated from the liquid phase and washed 8 times with dry, refined n-hexane, whereupon 115 g of a solid substance having a reddish purple colour were obtained.

(B) Treatment with a Complexing Agent

The reddish purple solid substance obtained by the above (A) was suspended in 750 ml of n-hexane. While stirring the suspension at 30° C., 105 ml of diisoamyl ether were gradually added thereto. After the addition, the stirring at the same temperature was continued for one hour. Then, the solid substance thus obtained was separated from the liquid phase and washed 8 times with n-hexane, whereupon a solid substance of a brown colour was obtained.

(C) Treatment with Carbon Tetrachloride

The brown solid substance obtained by the above (B) was treated, while stirring, with a n-hexane solution of 4 mole/liter of carbon tetrachloride at a temperature of 30° C. for 5 hours. The molar ratio of the carbon tetrachloride to titanium trichloride in the brown solid substance was 2. The solid product was separated from the liquid phase, and washed 8 times with n-hexane, whereupon 98 g of a solid titanium trichloride-based catalytic complex having a reddish purple colour were obtained. As a result of an elementary analysis, it was found that this complex had a composition of TiCl$_3$.

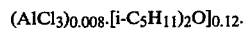

$(AlCl_3)_{0.008} \cdot [i\text{-}C_5H_{11})_2O]_{0.12}$.

CATALYST PREPARATORY EXAMPLE 9

(Synthesis of a solid titanium trichloride-based catalytic complex)

(A) Preparation of a Reduced Solid Subtance 225 ml of dry, refined n-dodecane and 55 ml of titanium tetrachloride were introduced under an argon atmosphere into a one liter flask. The titanium tetrachloride solution was cooled to a temperature of −5° C. While stirring at adequately at a temperature of −5° C., a homogeneous solution of 350 ml of dodecane and 115 ml of ethyl aluminum sesquichloride was gradually added within 3 hours to the titanium tetrachloride solution. After the addition, the stirring was continued at the same temperature for further 2 hours to complete the reduction reaction. Then, the solid phase was separated from the liquid phase and washed 8 times with dry, refined n-hexane, whereupon 115 g of a solid substance having a reddish purple colour were obtained.

(B) Treatments with a Complexing Agent and Carbon Tetrachloride

The solid substance obtained by the above (A) is suspended in 330 ml of n-hexane. While stirring the suspension at a temperature of 30° C., a mixed solution of 105 ml of diisoamyl ether and 193 ml of carbon tetrachloride was gradually added. The molar ratio of diisoamyl ether to titanium trichloride in the reduced solid substance was 1.0. Likewise, the molar ratio of the carbon tetrachloride to the titanium trichloride was 4. Upon the completion of the addition, the concentration of the diisoamyl ether in the mixed solution of the three components i.e. n-hexane, diisoamyl ether and carbon tetrachloride was 0.8 mole/liter. Likewise, the concentration of the carbon tetrachloride in the mixed solution was 3.2 mole/liter. After the addition, the stirring was continued at the same temperature for 4 hours. Then, the solid was separated from the liquid phase and washed 8 times with n-hexane whereupon solid titanium trichloride-based catalytic complex having a reddish purple color was obtained. As a result of an elementary analysis, it was found that the complex had a composition of $TiCl_3 \cdot (AlCl_3)_{0.007} \cdot [(i-C_5H_{11})_2O]_{0.11}$.

EXAMPLES 42 to 50 AND COMPARATIVE EXAMPLES 29 to 37

A series of polymerization tests were conducted with use of the solid titanium trichloride-based catalytic complex obtained by Catalyst Preparatory Example 8 as catalyst. Namely, propylene polymerization was conducted at a temperature of 70° C. for 3 hours in a manner similar to Example 34 with use of the above catalyst and, as a co-catalyst, organic aluminum compounds obtained by Co-catalyst Preparatory Examples 1 to 3 or di-n-butyl aluminum chloride or di-n-octyl aluminum chloride and in some cases with further use of an electron donor compound. The polymerization conditions and the results are shown in Tables 20 and 21. These results were obtained under the same polymerization conditions and therefore they are comparable with one another. With use of N-propyl aluminum chloride and n-hexyl aluminum chloride, a polypropylene having a high stereospecificity (I.I.) was obtained with a high polymerization activity (K) when n was within the range of 1.95 to 2.10 (Examples 42 to 44 and 45 to 47). More importantly, these K and I.I. values are higher than those obtained by organic aluminum compounds having an ethyl, n-butyl, or n-octyl group (Comparative Examples 31 to 35). Further, it is found that with addition of an electron donor compound such as ethyl benzoate, phenyl acetate or toluene, the stereospectificity can be remarkably improved while the reduction of the polymerization activity (K) is small (Examples 48 to 50).

EXAMPLES 51 TO 59 AND COMPARATIVE EXAMPLES 38 TO 44

A series of polymerization tests were conducted with use of the solid titanium trichloride-based catalytic complex obtained by Catalyst Preparatory Example 9. Namely, propylene polymerization was conducted at a temperature of 70° C. for 3 hours in a manner similar to Example 34 with use of the above catalyst and, as a co-catalyst, organic aluminum compounds obtained by Co-catalyst Preparatory Examples 1 to 3 or di-n-butyl aluminum monochloride or di-n-octyl aluminum monochloride and in some cases with further use of an electron donor compound. The polymerization conditions and the results are shown in Table 22 and 23. These results were obtained under the same conditions and therefore they are comparable with one another. The same tendency was observed in Catalyst Preparatory Example 9 as in Catalyst Preparatory Example 8. Namely, it was found that in the cases where n-propyl aluminum chloride and n-hexyl aluminum chloride were used, both the stereospecificity (I.I.) and the polymerization activity (K) were high when n was within the range of 1.95 to 2.10 (Examples 51 to 53 and 54 to 56). Further, these K and I.I. values were higher than those obtained by commonly used diethyl aluminum monochloride or organic aluminum compounds having a n-butyl or n-octyl group (Comparative Examples 40 to 42). Examples 57 to 59 indicate that with addition of ethyl benzoate, methyl methacrylate or toluene, the stereospecificity (I.I.) is improved while the reduction of the polymerization activity (K) is small. Comparative Examples 38 and 39, and 43 and 44 indicate, respectively, that when the value of n is less than 1.95, K is reduced, and when the value of n is more than 2.10, I.I. is reduced.

TABLE 20

| | Amount of titanium trichloride in solid titanium trichloride-based catalytic complex mg | Cocatalyst $AlR'_nCl_{3-n}$ | | | Type and Amount of electron donor compound | Yield of polypropylene g | C.E. | K | I.I. % | $\rho_B$ g/cc | M.F.I. g/10 min. |
|---|---|---|---|---|---|---|---|---|---|---|---|
| | | kind of R1 | Value of n | Amount m mole | | | | | | | |
| Example 42 | 21.2 | n-C3H7 | 1.95 | 1.0 | — | 328 | 15500 | 172 | 94.7 | 0.36 | 3.9 |
| Example 43 | 18.7 | " | 2.00 | " | — | 290 | 15500 | 172 | 94.5 | 0.36 | 4.2 |
| Example 44 | 23.4 | " | 2.10 | " | — | 364 | 15600 | 173 | 93.2 | 0.36 | 4.6 |
| Comp. Ex. 29 | 22.6 | " | 1.91 | " | — | 199 | 8800 | 98 | 95.3 | 0.36 | 3.2 |
| Comp. Ex. 30 | 19.5 | " | 2.15 | " | — | 298 | 15300 | 170 | 88.3 | 0.35 | 4.7 |
| Comp. Ex. 31 | 19.5 | C2H5 | 1.95 | " | — | 196 | 10100 | 112 | 92.5 | 0.36 | 4.2 |
| Comp. Ex. 32 | 20.5 | " | 2.00 | " | — | 256 | 12500 | 139 | 92.1 | 0.36 | 3.5 |
| Comp. Ex. 33 | 23.1 | " | 2.05 | " | — | 336 | 14500 | 162 | 80.3 | 0.33 | 2.7 |
| Comp. Ex. 34 | 32.8 | n-C4H9 | 2.00 | " | — | 223 | 6800 | 76 | 88.3 | 0.35 | 4.4 |
| Comp. Ex. 35 | 31.4 | n-C8H17 | 2.00 | " | — | 324 | 10300 | 115 | 73.4 | 0.32 | 5.6 |

TABLE 21

| | Amount of titanium trichloride in solid titanium trichloride-based catalytic complex mg | Cocatalyst $AlR_n^1Cl_{3-n}$ | | | Type and Amount of electron donor compound | Yield of polypropylene g | C.E. | K | I.I. % | B g/cc | M.F.I. g/10 min |
|---|---|---|---|---|---|---|---|---|---|---|---|
| | | kind of R1 | Value of n | Amount m mole | | | | | | | |
| Example 45 | 20.1 | n-C6H13 | 1.95 | 1.0 | — | 298 | 14800 | 165 | 94.5 | 0.36 | 4.4 |
| Example 46 | 17.3 | " | 2.00 | " | — | 263 | 15200 | 169 | 94.3 | 0.36 | 5.1 |
| Example 47 | 15.4 | " | 2.10 | " | — | 236 | 15300 | 170 | 93.5 | 0.36 | 3.6 |
| Comp. Ex. 36 | 18.0 | " | 1.90 | " | — | 171 | 9500 | 106 | 95.0 | 0.37 | 2.4 |
| Comp. Ex. 37 | 18.3 | " | 2.15 | " | — | 289 | 15800 | 175 | 89.3 | 0.35 | 4.6 |
| Example 48 | 16.4 | n-C3H7 | 2.00 | " | ethyl benz- | 239 | 14600 | 162 | 96.3 | 0.36 | 2.5 |

TABLE 21-continued

| | Amount of titanium trichloride in solid titanium trichloride-based catalytic complex mg | Cocatalyst AlR$_n^1$Cl$_{3-n}$ | | | Type and Amount of electron donor compound | Yield of polypropylene g | C.E. | K | I.I. % | B g/cc | M.F.I. g/10 min |
|---|---|---|---|---|---|---|---|---|---|---|---|
| | | kind of R1 | Value of n | Amount m mole | | | | | | | |
| Example 49 | 15.9 | " | " | " | oate 0.02 m mole phenyl acetate | 226 | 14200 | 158 | 95.9 | 0.36 | 2.7 |
| Example 50 | 15.8 | " | " | " | 0.01 m mole toluene 20 ml | 240 | 15200 | 169 | 95.5 | 0.36 | 3.8 |

TABLE 22

| | Amount of titanium trichloride in solid titanium trichloride-based catalytic complex mg | Cocatalyst AlR$_n^1$Cl$_{3-n}$ | | | Type and Amount of electron donor compound | Yield of polypropylene g | C.E. | K | I.I. % | $\rho_B$ g/cc | M.F.I. g/10 min |
|---|---|---|---|---|---|---|---|---|---|---|---|
| | | kind of R1 | Value of n | Amount m mole | | | | | | | |
| Example 51 | 24.5 | n-C$_3$H$_7$ | 1.95 | 1.0 | — | 396 | 16200 | 180 | 94.4 | 0.36 | 3.1 |
| Example 52 | 16.7 | " | 2.00 | " | — | 275 | 16500 | 183 | 94.3 | 0.36 | 2.6 |
| Example 53 | 15.3 | " | 2.10 | " | — | 261 | 17100 | 190 | 94.1 | 0.36 | 3.0 |
| Comp. Ex. 38 | 25.1 | " | 1.91 | " | — | 231 | 9200 | 102 | 95.2 | 0.36 | 3.4 |
| Comp. Ex. 39 | 18.8 | " | 2.15 | " | — | 345 | 18400 | 204 | 88.3 | 0.34 | 4.0 |
| Comp. Ex. 40 | 24.2 | C$_2$H$_5$ | 2.00 | " | — | 331 | 13700 | 152 | 92.8 | 0.35 | 3.5 |
| Comp. Ex. 41 | 30.5 | n-C$_4$H$_9$ | " | " | — | 189 | 6200 | 69 | 90.7 | 0.35 | 3 |
| Comp. Ex. 42 | 29.5 | n-C$_8$H$_{17}$ | " | " | — | 330 | 11200 | 124 | 80 | 0.34 | 5.7 |

TABLE 23

| | Amount of titanium trichloride in solid titanium trichloride-based catalytic complex mg | Cocatalyst AlR$_n^1$Cl$_{3-n}$ | | | Type and amount of electron donor compound | Yield of polypropylene g | C.E. | K | I.I. % | $\rho_B$ g/cc | M.F.I. g/10 min |
|---|---|---|---|---|---|---|---|---|---|---|---|
| | | kind of R1 | Value of n | Amount m mole | | | | | | | |
| Example 54 | 22.1 | n-C$_6$H$_{13}$ | 1.95 | 1.0 | — | 350 | 15800 | 176 | 94.8 | 0.36 | |
| Example 55 | 19.0 | " | 2.00 | " | — | 299 | 15700 | 175 | 94.5 | 0.36 | |
| Example 56 | 18.0 | " | 2.10 | " | — | 288 | 16000 | 178 | 94.0 | 0.36 | |
| Comp. Ex. 43 | 21.3 | " | 1.90 | " | — | 212 | 9950 | 111 | 95.6 | 0.36 | |
| Comp. Ex. 44 | 21.4 | " | 2.15 | " | — | 375 | 17500 | 195 | 87.3 | 0.34 | |
| Example 57 | 20.0 | n-C$_3$H$_7$ | 2.00 | " | ethyl benzoate 0.02 m mole | 281 | 14100 | 156 | 96.3 | 0.36 | |
| Example 58 | 19.3 | " | " | " | methyl methacrylate 0.02 m mole | 298 | 15400 | 172 | 95.7 | 0.36 | |
| Example 59 | 18.2 | " | " | " | toluene 20 ml | 278 | 15300 | 170 | 95.8 | 0.36 | |

CATALYST PREPARATORY EXAMPLE 10

(Synthesis of a solid titanium trichloride-based catalytic complex)

The procedure of the step (A) of the Catalyst Preparatory Example 4 was repeated except that 37 m moles of titanium tetrachloride was used instead of 2.5 m moles of titanium tetraiodide and 34.5 m moles of titanium tetrachloride, thereby obtaining a homogeneous titanium trichloride solution. This solution was then treated in the same manner as in the step (B) of the Catalyst Preparatory Example 4 to obtain a fine particulate purple titanium trichloride-based complex. As a result of the elementary analysis, it was found that the catalytic complex had a composition of the formula:

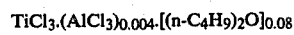

TiCl$_3$.(AlCl$_3$)$_{0.004}$.[(n-C$_4$H$_9$)$_2$O]$_{0.08}$

EXAMPLE 60

The polymerization of propylene was conducted, as follows, in high catalytic efficiency in an induction-agitated, 3l autoclave using the solid titanium trichloride-based catalytic complex obtained in Catalyst Preparatory Example 10. There were introduced the solid titanium trichloride-based catalytic complex obtained in Catalyst Preparatory Example 10 in an amount of 20.0 mg calculated as titanium trichloride and 1.3 ml f an n-hexane solution di-n-propylaluminum monochloride with a concentration of 0.5 m moles/ml into the autoclave which had been sufficiently dried under vacuum and substituted with nitrogen 0.6 kg/cm$^2$ of hydrogen gas was charged into the autoclave and 800 g of liquefied propylene was further charged, followed by polymerizing at 70° C. for 3 hours. After completion of the polymerization, an excess of propylene was expelled to obtain 461 g of white powdery polypropylene.

The test results are shown in Table 24.

COMPARATIVE EXAMPLE 45

Example 60 was repeated using diethylaluminum monochloride instead of di-n-propylaluminum monochloride.

The test results are shown in Table 24.

EXAMPLE 61

Example 60 was repeated using di-n-hexylaluminum monochloride instead of di-n-propylaluminum monochloride.

The test results are shown in Table 24.

TABLE 24

| No. | type of organic aluminum compound | C.E. | K. | bulk density (g/cc) | I.I. (%) | M.F.I. (g/10 min) |
|---|---|---|---|---|---|---|
| Example 60 | di-n-propyl-aluminum monochloride | 23,040 | 256 | 0.39 | 95.0 | 2.8 |
| Example 61 | di-n-hexyl-aluminum monochloride | 24,480 | 272 | 0.39 | 94.7 | 1.4 |
| Comparative Example 45 | diethyl-aluminum monochloride | 17,910 | 199 | 0.39 | 93.5 | 1.5 |

Having now fully described this invention, it will be apparent to one of ordinary skill in the art that many changes and modifications can be made thereto without departing from the spirit or scope of the invention set forth herein.

What is claimed as new and intended to be covered by Letters Patent is:

1. A process for polymerizing propylene, which comprises: polymerizing propylene in the presence of a catalyst system composed of:
    (A) a solid titanium trichloride-based complex which is a fine particulate solid obtained by reducing titanium tetrachloride with an organic aluminum compound and treating the reduction product with an ether or a thioether and then with titanium tetrachloride, and which is expressed by the formula:

$TiCl_3 \cdot (AlR_p^3 X_{3-p})_x \cdot (C)_y$, wherein $R^3$ is a hydrocarbon group of 1–20 carbon atoms, X is a halogen atom, p is a value within the range of $0 \leq p \leq 2$, C is an ether or a thioether, x is a value less than 0.15 and y is a value greater than 0.001, and
    (B) an organic aluminum cocatalyst of the formula:

$AlR_n^1 Cl_{3-n}$, wherein $R^1$ is a n-propyl group or a n-hexyl group and n is a value of 1.95–2.10.

2. A process for polymerizing propylene, which comprises: polymerizing propylene in the presence of a catalyst system composed of
    (A) a solid titanium trichloride-based complex which is a fine particulate solid obtained by reducing titanium tetrachloride with an organic aluminum compound and treating the reduction product with an ether or a thioether and then with titanium tetrachloride, and which is expressed by the formula:

$TiCl_3 \cdot (AlR_p^3 X_{3-p})_x \cdot (C)_y$, wherein $R^3$ is a hydrocarbon group of 1–20 carbon atoms, X is a halogen atom, p is a value within the range of $0 \leq p \leq 2$, C is an ether or a thioether, x is a value less than 0.15 and y is a value greater than 0.001;
    (B) an organic aluminum cocatalyst of the formula:

$AlR_n^1 Cl_{3-n}$, wherein $R^1$ is a n-propyl group or a n-hexyl group and n is a value of 1.95–2.10; and
    (C) an electron donor compound.

3. A process for polymerizing propylene, which comprises: polymerizing propylene in the presence of a catalyst system composed of
    (A) a solid titanium trichloride-based complex which is a fine particulate solid obtained by reducing titanium tetrachloride with an organic aluminum compound and treating the reduction product with an ether or a thioether and then with carbon tetrachloride and which is expressed by the formula:

$TiCl_3 \cdot (AlR_p^3 X_{3-p})_x \cdot (C)_y$, wherein $R^3$ is a hydrocarbon group of 1–20 carbon atoms, X is a halogen atom, p is a value within the range of $0 \leq p \leq 2$, C is an ether or a thioether, x is a value less than 0.15 and y is a value greater than 0.001; and
    (B) an organic aluminum cocatalyst of the formula:

$AlR_n^1 Cl_{3-n}$, wherein $R^1$ is a n-propyl group or a n-hexyl group and n is a value of 1.95–2.10.

4. A process for polymerizing propylene, which comprises: polymerizing propylene in the presence of a catalyst system composed of
    (A) a solid titanium trichloride-based complex which is a fine particulate solid obtained by reducing titanium tetrachloride with an organic aluminum compound and treating the reduction product with an ether or a thioether and then with carbon tetrachloride, and which is expressed by the formula:

$TiCl_3 \cdot (AlR_p^3 X_{3-p})_x \cdot (C)_y$, wherein $R^3$ is a hydrocarbon group of 1–20 carbon atoms, X is a halogen atom, p. is a value within the range of $0 \leq p \leq 2$, C is an ether or a thioether, x is a value less than 0.15 and y is a value greater than 0.001;
    (B) an organic aluminum cocatalyst of the formula:

$AlR_n^1 Cl_{3-n}$, wherein $R^1$ is a n-propyl group or a n-hexyl group and n is a value of 1.95–2.10; and
    (C) an electron donor compound.

5. A process for polymerizing propylene, which comprises: polymerizing propylene in the presence of a catalyst system composed of:
    (A) a solid titanium trichloride-based complex which is a fine particulate solid obtained by reducing titanium tetrachloride with an organic aluminum compound and treating the reduction product with a mixture of carbon tetrachloride and a complexing agent selected from the group consisting of ethers and thioethers, and which is expressed by the formula:

$$TiCl_3 \cdot (AlR^3_p X_{3-p})_x \cdot (C)_y,$$

wherein $R^3$ is a hydrocarbon group of 1–20 carbon atoms, X is a halogen atom, p is a value within the range of $0 \leq p \leq 2$, C is an ether or a thioether, x is a value less than 0.15 and y is a value greater than 0.001; and (B) an organic aluminum cocatalyst of the formula:

$$AlR^1_n Cl_{3-n},$$

wherein $R^1$ is a n-propyl group or a n-hexyl group and n is a value of 1.95–2.10.

6. A process for polymerizing propylene, which comprises: polymerizing propylene in the presence of a catalyst system composed of (A) a solid titanium trichloride-based complex which is a fine particulate solid obtained by reducing titanium tetrachloride with an organic aluminum compound and treating the reduction product with a mixture of carbon tetrachloride and a complexing agent selected from the group consisting of ethers and thioethers, and which is expressed by the formula:

$$TiCl_3 \cdot (AlR^3_p X_{3-p})_x \cdot (C)_y,$$

wherein $R^3$ is a hydrocarbon group of 1–20 carbon atoms, X is a halogen atom, p is a value within the range of $0 \leq p \leq 2$, C is an ether or a thioether, x is a value less than 0.15 and y is a value greater than 0.001;

(B) an organic aluminum cocatalyst of the formula:

$$AlR^1_n Cl_{3-n},$$

wherein $R^1$ is an n-propyl group or a n-hexyl group and n is a value of 1.95–2.10; and (C) an electron donor compound.

7. The process of claim 1, 2, 3, 4, 5 or 6 wherein said organic aluminum compound is the reaction product of tri-n-propylaluminum or tri-n-hexylaluminum and aluminum trichloride.

8. The process of claim 1, 2, 3, 4, 5 or 6 wherein said organic aluminum compound is the reaction product of (a) tri-n-propylaluminum, tri-n-hexylaluminum or aluminum trichloride and (b) a compound of the formula, $AlR^2_m Cl_{3-m}$ wherein $R^2$ represents a n-propyl group or a n-hexyl group, and m is a value within the range of $0 \leq m \leq 3$.

9. The process of claim 1, 2, 3, 4, 5 or 6, wherein said organic aluminum compound is di-n-propylaluminum monochloride or di-n-hexylaluminum monochloride.

10. The process of claim 1, 2, 3, 4, 5 or 6, wherein said solid titanium trichloride-based complex is one which exhibits, in its X-ray diffraction chart, a halo of maximum intensity at a position corresponding to the maximum peak of $\alpha$-titanium trichloride.

11. The process of claim 1, 2, 3, 4, 5 or 6, wherein propylene is randon copolymerized or block copolymerized with a second $\alpha$-olefin so that the propylene content in the product copolymer is greater than 80 wt. %.

12. The process of claim 1, 2, 3, 4, 5 or 6, wherein the polymerization of propylene is conducted until polypropylene is produced in an amount of greater than 5000 grams per gram of the titanium trichloride component of said complex.

13. The process according to claim 1, 2, 3, 4, 5 or 6, wherein the polymerization of propylene is conducted until polypropylene is produced in an amount of greater than 10,000 grams per gram of titanium trichloride of said complex.

14. The process according to claim 1, 2, 3, 4, 5 or 6, wherein said polymerization reaction is conducted at a temperature of 50°–100° C. under a pressure of atmospheric pressure to 100 atmospheres.

15. The process according to claim 2, 4 or 6, wherein said electron donor compound is an ether, polyether, alkylene oxide, firan, amine, trialkylphosphine, triarylphosphine, pyridine, quinoline, phosphoric acid ester, phosphoric acid amide, phosphine oxide, trialkylphosphite, triarylphosphite, ketone, carboxylic acid ester or carboxylic acid amide.

* * * * *